United States Patent
Tomoike

[19]

[11] Patent Number: 5,940,512
[45] Date of Patent: Aug. 17, 1999

[54] ROAMING METHOD CAPABLE OF IMPROVING ROAMING REGISTRATION PROCEDURE

[75] Inventor: Hiroyuki Tomoike, Tokyo, Japan

[73] Assignee: NEC Corporation, Tokyo, Japan

[21] Appl. No.: 08/879,234

[22] Filed: Jun. 19, 1997

[30] Foreign Application Priority Data

Jun. 21, 1996 [JP] Japan .................................. 8-161647

[51] Int. Cl.⁶ .............................. H04L 9/32; H04L 9/08; H04L 9/30; H04Q 7/22
[52] U.S. Cl. .................................. 380/25; 380/9; 380/21; 380/23; 380/30; 380/49; 455/410; 455/411; 455/422; 455/432
[58] Field of Search ................................... 380/9, 21, 23, 380/25, 30, 46, 49, 59, 50; 455/403, 410, 411, 422, 432, 436

[56] References Cited

U.S. PATENT DOCUMENTS

| | | | |
|---|---|---|---|
| 5,239,294 | 8/1993 | Flanders et al. | 380/46 X |
| 5,377,267 | 12/1994 | Suzuki et al. | 380/23 |
| 5,471,532 | 11/1995 | Gardeck et al. | 380/21 |
| 5,537,474 | 7/1996 | Brown et al. | 380/23 |
| 5,596,641 | 1/1997 | Ohashi et al. | 380/23 |
| 5,668,875 | 9/1997 | Brown et al. | 380/23 |

FOREIGN PATENT DOCUMENTS 4-352525  12/1992  Japan .
7-288866  10/1995  Japan .

*Primary Examiner*—Bernarr E. Gregory
*Attorney, Agent, or Firm*—Sughrue, Mion, Zinn, Macpeak & Seas, PLLC

[57] ABSTRACT

A roaming terminal enciphers a subscriber's number thereof using a public key of a home network and sends the enciphered subscriber's number to the home network via a roamed network. The home network deciphers the enciphered subscriber's number using a secret key to derive the subscriber's number. The home network generates a temporary authentication key and enciphers it using a public key of the roaming terminal corresponding to the subscriber's number. Then, the home network notifies the temporary authentication key and the enciphered temporary authentication key to the roamed network which then notifies the roaming terminal of the enciphered temporary authentication key and a random number generated at the roamed network. Then, an authentication process for the roaming terminal is performed between the roaming terminal and the roamed network using the random number, the temporary authentication key and the enciphered temporary authentication key. After completion of the authentication, the roamed network acquires a roaming number of the roaming terminal and notifies it to the roaming terminal and the home network. The roaming terminal, the roamed network and the home network store the roaming number and the temporary authentication key, respectively.

9 Claims, 4 Drawing Sheets

ROAMING METHOD CAPABLE OF IMPROVING ROAMING REGISTRATION PROCEDURE

BACKGROUND OF THE INVENTION

The present invention relates to a roaming method to be performed, particularly when a mobile terminal moves or roams to a service area of a service provider with which the mobile terminal has no contract, and further relates to a mobile communication system which is capable of carrying out such a roaming method.

In the field of mobile communication, a plurality of service providers have been offering their services in different regions or areas, respectively. These service providers have been offering roaming services so as to allow a mobile terminal located in a service area of a service provider with which the mobile terminal has no contract, to receive a service similar to that offered in a service area of a service provider with which the mobile terminal has a particular contract.

As will later be described in detail, in the conventional roaming method, for performing an authentication process of a roaming terminal with efficiency, an authentication key of the roaming terminal is notified from a home network to a roamed network during an initial roaming terminal registration procedure. Thus, there has been a problem of security in the conventional roaming method in view of data leakage since the authentication key of the corresponding roaming terminal is known by the roamed network.

For solving the foregoing problem, a method has been proposed as disclosed in Japanese Unexamined Patent Publication No. 4-352525(352525/92). In this method, a roamed network, in response to a location registration request received from a roaming terminal, first produces a temporary authentication key for use in a roaming terminal registration procedure and sends it to a home network. The home network performs an authentication of the roaming terminal via the roamed network. The home network holds a temporary authentication key setting key which is the same as that held by the roaming terminal. After completion of the authentication of the roaming terminal, the home network enciphers the temporary authentication key using the setting key and sends the enciphered temporary authentication key to the roaming terminal via the roamed network. Then, the roaming terminal deciphers the enciphered temporary authentication key using the setting key so as to derive the temporary authentication key. After this, the temporary authentication key is used for an authentication process relative to the roamed network. In this manner, the roaming terminal registration procedure can be performed without revealing an authentication key of the roaming terminal to the roamed network.

As described above, in the conventional roaming method, it is necessary that the roaming terminal first sends the subscriber's number (MSN) to the roamed network for achieving the location registration request. Since the roaming terminal carries out a transmission by radio, the transmission may be subjected to interception so that secrecy of the roaming terminal can not be ensured.

SUMMARY OF THE INVENTION

Therefore, it is an object of the present invention to provide an improved roaming method which can perform a roaming terminal registration procedure without revealing peculiar data about a roaming terminal to a roamed network.

It is another object of the present invention to provide an improved mobile communication system which can ensure high security.

According to one aspect of the present invention, a roaming method for allowing a mobile terminal to receive from a roamed network other than a home network of the mobile terminal a mobile communication service among mobile communication services which are offered by a plurality of service providers at different service areas, respectively, comprises the steps of: providing the mobile terminal with a first cipher key; providing the home network with a first decipher key which is for deciphering data enciphered by using said first cipher key; enciphering identification data of the mobile terminal using the first cipher key at the mobile terminal upon notifying the identification data from the mobile terminal to the home network via the roamed network; and deciphering the enciphered identification data using the first decipher key at the home network.

DESCRIPTION OF THE PREFERRED EMBODIMENT

Figure 1:
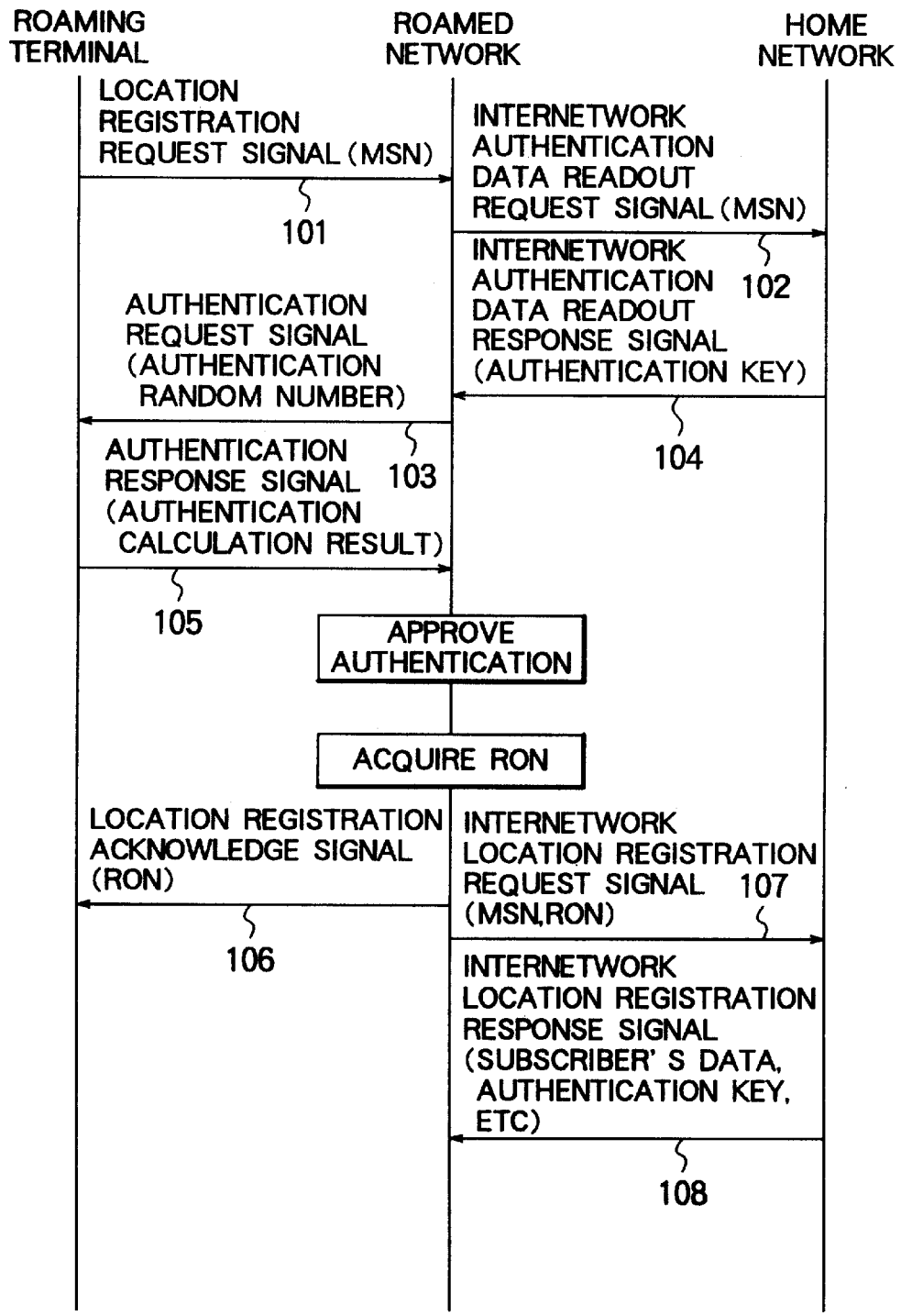
FIG. 1 is a diagram for explaining a roaming terminal registration procedure according to a conventional roaming method.

Referring to FIG. 1, a registration procedure of a roaming terminal in a conventional mobile terminal roaming method will be explained hereinbelow. From notify data constantly received from a radio base station, a mobile terminal notices that it has performed internetwork roaming and thus it has become a roaming terminal. Specifically, the roaming terminal notices that it has got out of a service area of a home network with which the roaming terminal has a particular contract and entered a service area of another service provider, that is, of a roamed network. Then, the roaming terminal sends a location registration request signal 101 to the roamed network. The signal 101 includes as a subscriber's ID a subscriber's number (hereinafter referred to as "MSN").

In response to the location registration request signal 101 received from the roaming terminal, the roamed network (namely, an exchange included in the roamed network) recognizes from MSN contained therein that the terminal is a roaming terminal. Then, for performing an authentication process, the roamed network sends an internetwork authentication data readout request signal 102 to the home network known from MSN. The signal 102 includes MSN. The roamed network further sends an authentication request signal 103 to the roaming terminal. The signal 103 includes an authentication random number generated at the roamed network. The home network stores authentication keys necessary for authenticating all mobile terminals belonging thereto. In response to the internetwork authentication data readout request signal 102 received from the roamed network, the home network looks up an authentication key of a mobile terminal assigned with MSN contained in the signal 102. Then, the home network notifies the located authentication key to the roamed network in the form of an internetwork authentication data readout response signal 104.

On the other hand, in response to the authentication request signal 103 received from the roamed network, the roaming terminal performs a calculation at a calculation circuit using the authentication random number contained in the signal 103 and its own authentication key stored therein, and then sends a result of the calculation to the roamed network in the form of an authentication response signal 105.

Then, the roamed network performs a calculation using the authentication key derived from the internetwork authentication data readout response signal 104 from the home network and the authentication random number which is the same as that sent to the roaming terminal in the form of the authentication request signal 103. Thereafter, the roamed network performs a comparison between a result of the calculation performed by the roamed network and the calculation result contained in the authentication response signal 105. If these calculation results coincide with each other, the roaming terminal is judged to be a mobile terminal recorded at the home network, that is, the authentication is approved. Then, the roamed network acquires a roaming number (RON) to be assigned to the roaming terminal and sends a location registration acknowledge signal 106 including RON to the roaming terminal. The roamed network further sends an internetwork location registration request signal 107 including MSN and RON to the home network.

In response to the signal 107 received from the roamed network, the home network stores MSN and RON contained in the signal 107. Then, the home network sends data about the mobile terminal corresponding to MSN, such as subscriber's data and authentication key, to the roamed network in the form of an internetwork location registration response signal 108. In response to the signal 108 received from the home network, the roamed network stores the foregoing data about the mobile terminal contained in the signal 108 together with RON assigned to the corresponding roaming terminal.

In the conventional roaming method, roaming terminal registration procedure is performed in the manner as described above. After this, call processing for location registration of the roaming terminal and call processing for making a call from the roaming terminal are directly carried out between the roamed network and the roaming terminal.

In the conventional roaming method, for performing the authentication process of the roaming terminal with efficiency, the authentication key of the roaming terminal is notified from the home network to the roamed network during an initial roaming terminal registration procedure. There has been a problem of security in the conventional roaming method in view of data leakage since the authentication key of the corresponding mobile terminal is known by the roamed network.

As described above, in the conventional roaming method, it is necessary that the roaming terminal first sends the subscriber's number (MSN) to the roamed network for achieving the location registration request. Since the roaming terminal carries out a transmission by radio, the transmission may be subjected to interception so that secrecy of the roaming terminal can not be ensured.

Now, a preferred embodiment of the present invention will be described in detail hereinbelow with reference to the accompanying drawings.

First, a roaming terminal, a roamed network and a home network for carrying out a roaming method according to the preferred embodiment of the present invention will be described with reference to FIGS. 2–4.

Figure 2:
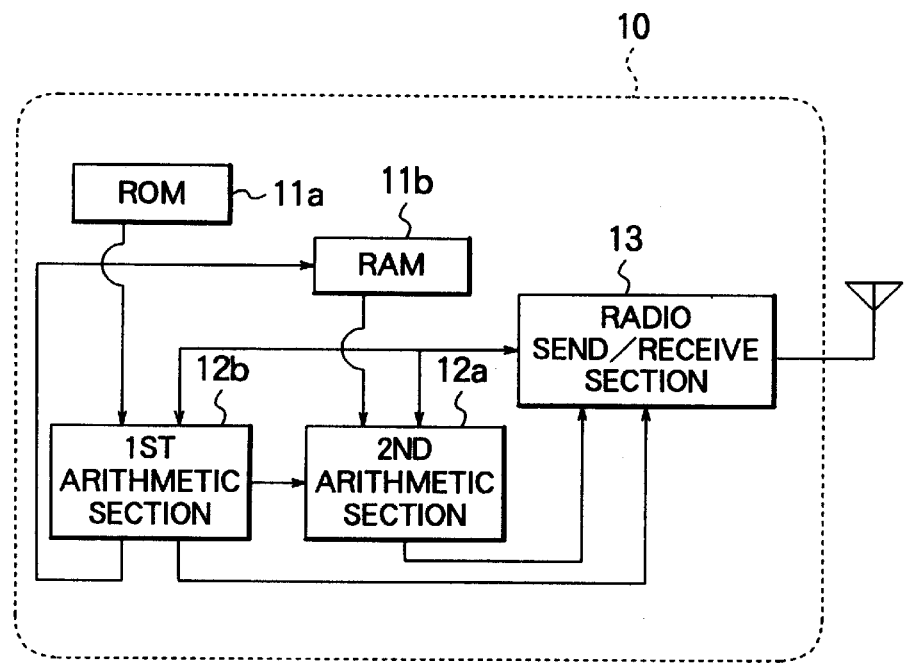
FIG. 2 is a block diagram of a roaming terminal which is applied with a roaming method according to a preferred embodiment of the present invention.

FIG. 2 is a block diagram of a roaming terminal 10. The roaming terminal 10 includes a read-only memory (hereinafter referred to as "ROM") 11*a*, a random-access memory (hereinafter referred to as "RAM") 11*b*, a first arithmetic section 12*a*, a second arithmetic section 12*b*, and a radio send/receive section 13. The roaming terminal 10 further includes a control section (not shown) for controlling them.

The ROM 11*a* stores a subscriber's (ID) number (hereinafter referred to as "MSN") assigned to the terminal 10, a secret key peculiar to the terminal 10, a network number of a home network, a public key of the home network and so on. The RAM 11*b* stores an authentication key sent from the home network upon performing a roaming terminal registration procedure. The first arithmetic section 12*a* performs a calculation in a secret key authentication manner, while the second arithmetic section 12*b* performs a calculation in a public key authentication manner.

Figure 3:
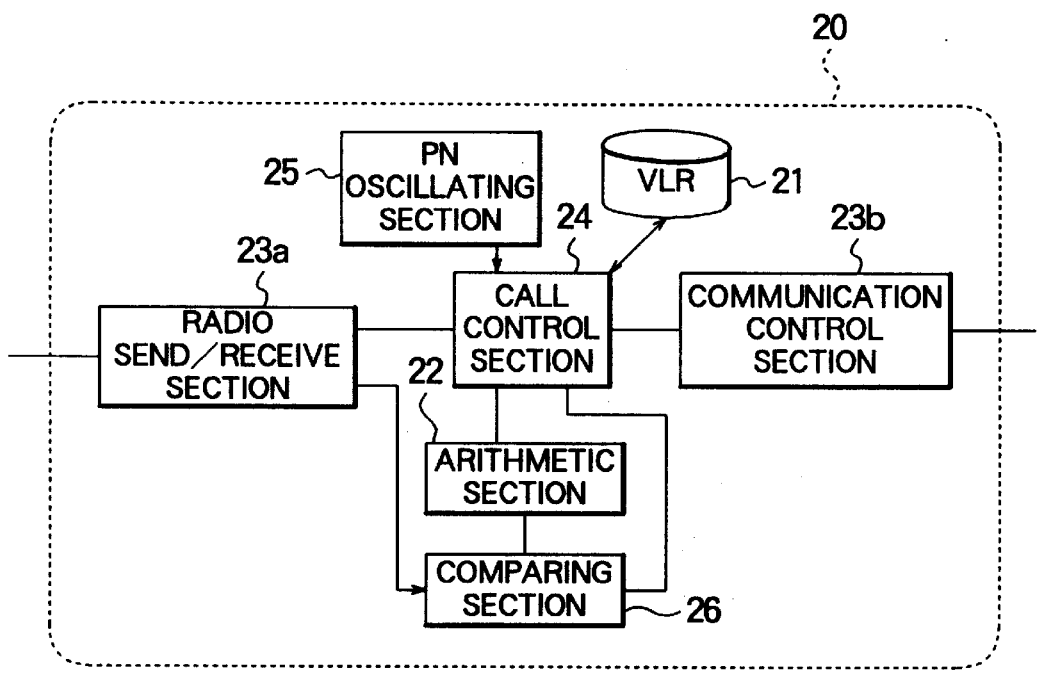
FIG. 3 is a block diagram of a roamed network which is applied with the roaming method according to the preferred embodiment of the present invention.

FIG. 3 is a block diagram of a roamed network (namely, an exchange included in the roamed network) 20. The roamed network 20 includes a visiting location register (hereinafter referred to as "VLR") 21, an arithmetic section 22, a radio send/receive section 23*a*, a call control section 24, a PN oscillating section 25 and a comparing section 26.

The VLR 21 stores a roaming number (hereinafter referred to as "RON"), an authentication key, positional data and the like of each of roaming subscribers. The arithmetic section 22 performs a calculation in a secret key authentication manner using the same algorithm as that of the first arithmetic section 12*a* in the roaming terminal 10. The radio send/receive section 23*a* is an interface with a radio base station (not shown), while the communication control section 23*b* is an interface with other networks including the home network of the roaming terminal 10. The call control section 24 performs a call control for a roaming terminal registration procedure including an authentication process. The PN oscillating section 25 generates a random number. The comparing section 26 compares calculation results so as to determine about an authentication.

Figure 4:
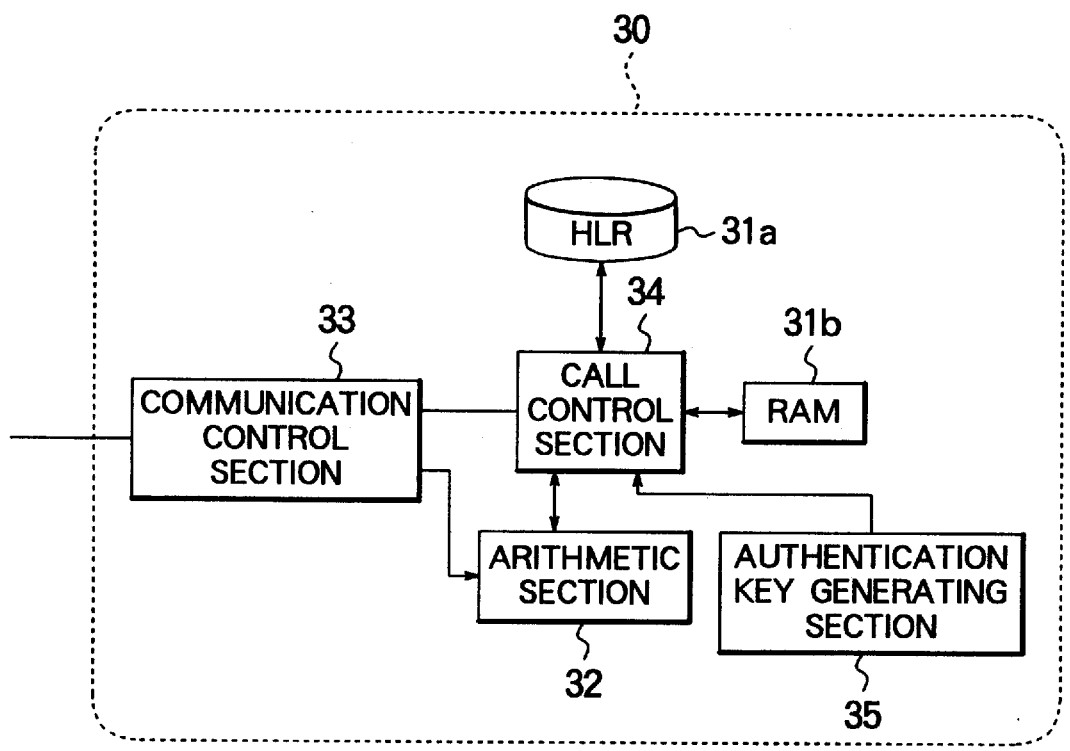
FIG. 4 is a block diagram of a home network which is applied with the roaming method according to the preferred embodiment of the present invention.

FIG. 4 is a block diagram of a home network (namely, an exchange included in the home network) 30 of the roaming terminal 10. The home network 30 includes a home location register (hereinafter referred to as "HLR") 31*a*, an RAM 31*b*, an arithmetic section 32, a communication control section 33, a call control section 34 and an authentication key generating section 35.

Figure 5:
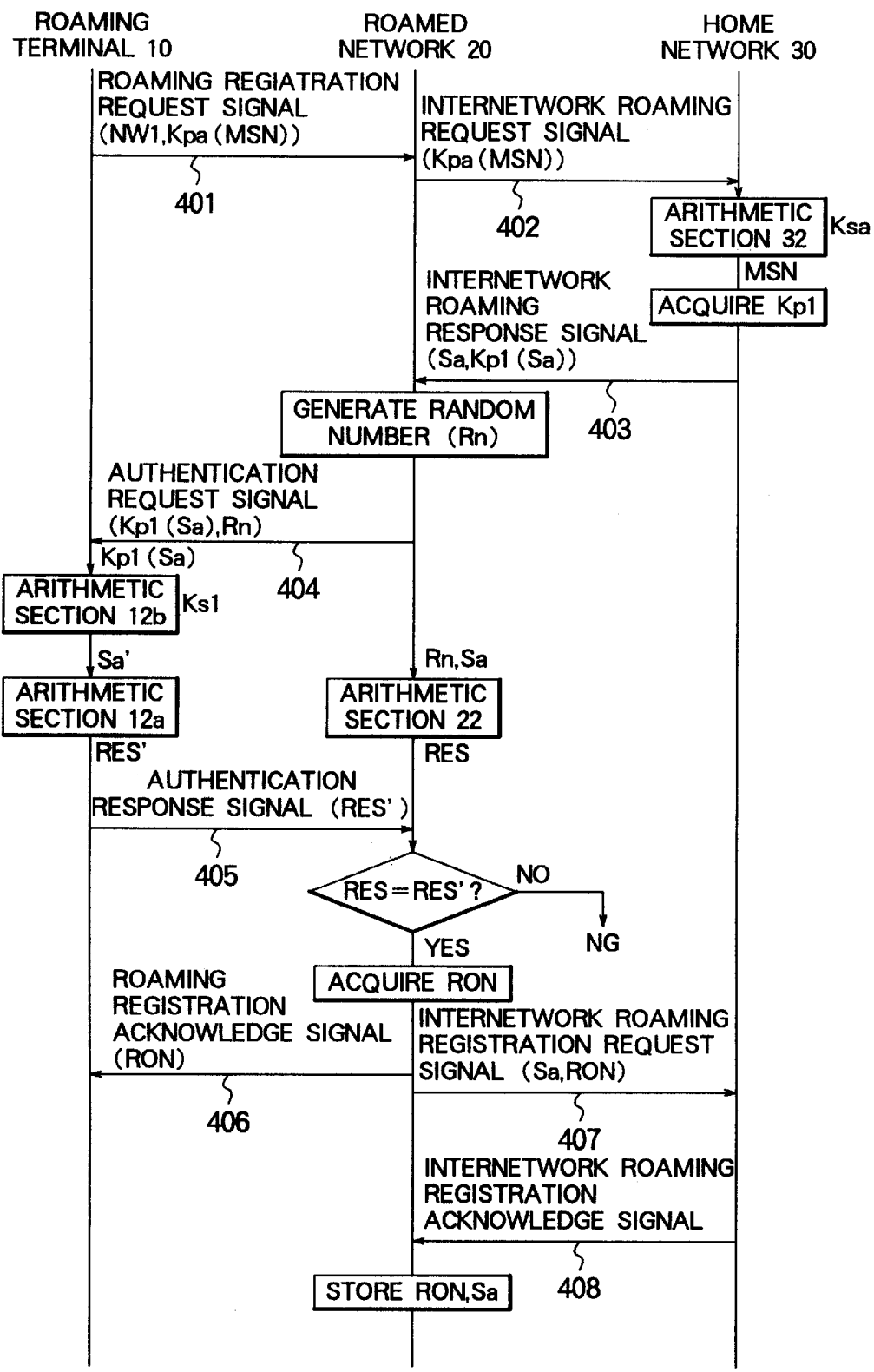
FIG. 5 is a diagram for explaining a roaming terminal registration procedure according to the roaming method of the preferred embodiment of the present invention.

The HLR 31*a* stores MSN, public keys and the like of a plurality of mobile terminals (including roaming terminals) belonging to the home network 30. The RAM 31*b* stores a secret key of the home network 30. The arithmetic section 32 performs a calculation in a public key authentication manner using the same algorithm as that of the arithmetic section 12*b* in the roaming terminal 10. The communication control section 33 is an interface with other networks including the roamed network 20. The call control section 34 performs call processing. The authentication key generating section 35 generates an authentication key to be used in authentication process between the roaming terminal 10 and the roamed network 20. Now, the roaming method in the system including the roaming terminal 10, the roamed network 20 and the home network 30 will be described also referring to FIG. 5.

While located in an area where a mobile communication service is offered, a mobile terminal recognizes a position thereof from notify data constantly sent from a mobile communication network. Thus, the mobile terminal can recognizes that it has entered a service area of a service provider with which it has no contract and thus it has become the roaming terminal 10.

Upon recognition of roaming to the roamed network 20 from the notify data, the control section of the roaming terminal 10 reads out from the ROM 11a a network number (hereinafter referred to as "NW1") of the home network 30, MSN and a public key (hereinafter referred to as "Kpa") of the home network 30. Then, the control section causes the arithmetic section 12b to execute a public key authentication calculation using MSN and Kpa to derive a calculation result (hereinafter referred to as "Kpa(MSN)"). That is, the arithmetic section 12b enciphers MSN using Kpa to derive Kpa(MSN). Then, via the radio send/receive section 13, the control section sends a roaming registration request signal 401 including NW1 and Kpa(MSN) to the roamed network 20.

At the roamed network 20, the call control section 24 receives the roaming registration request signal 401 via the radio send/receive section 23a. Then, from NW1 contained in the signal 401, the call control section 24 recognizes that a home network of the roaming terminal 10 is the home network 30. Subsequently, the call control section 24 sends to the home network 30 an internetwork roaming request signal 402 including Kpa(MSN) contained in the signal 401.

At the home network 30, the call control section 34 receives the internetwork roaming request signal 402 via the communication control section 33. In response to the signal 402, the call control section 34 reads out a secret key of the home network 30 (hereinafter referred to as "Ksa") from the RAM 31b for feeding to the arithmetic section 32 along with Kpa(MSN). The arithmetic section 32 executes a public key authentication calculation using Kpa(MSN) and Ksa. Specifically, the arithmetic section 32 deciphers the cipher Kpa(MSN) using Ksa to derive MSN of the roaming terminal 10. Based on MSN derived at the arithmetic section 32, the call control section 34 reads out a public key (hereinafter referred to as "Kp1") of the roaming terminal 10 from the HLR 31a. Simultaneously, the call control section 34 instructs the authentication key generating section 35 to generate an authentication key. In response to the instruction from the call control section 34, the authentication key generating section 35 generates a temporary authentication key (hereinafter referred to as "Sa") using a given known method and notifies Sa to the call control section 34.

Subsequently, the call control section 34 feeds thus obtained Kp1 and Sa to the arithmetic section 32. The arithmetic section 32 executes a public key calculation using Kp1 and Sa to derive a calculation result (hereinafter referred to as "Kp1(Sa)"). That is, the arithmetic section 32 enciphers Sa using Kp1. The call control section 34 sends via the communication control section 33 an internetwork roaming response signal 403 including Kp1(Sa) and Sa to the roamed network 20. At the roamed network 20, the call control section 24 derives Kp1(Sa) and Sa from the internetwork roaming response signal 403 received from the home network 30. Then, the call control section 24 sends to the roaming terminal 10 an authentication request signal 404 including Kp1(Sa) and a random number (hereinafter referred to as "Rn") generated at the PN oscillating section 25.

In response to the authentication request signal 404, the control section at the roaming terminal 10 reads out a secret key (hereinafter referred to as "Ks1") peculiar to the terminal 10 from the ROM 11a. Then, the control section causes the arithmetic section 12b to execute a calculation using Kp1(Sa) and Ks1. Specifically, the arithmetic section 12b deciphers Kp1(Sa) using Ks1 to derive a calculation result (hereinafter referred to as "Sa'"). Further, the control section causes the arithmetic section 12a to execute a calculation using Sa' and Rn. Specifically, the arithmetic section 12a enciphers Rn using Sa' to derive a calculation result RES'. The control section sends RES' via the radio send/receive section 13 to the roamed network 20 in the form of an authentication response signal 405.

In response to the authentication request signal 404, the arithmetic section 22 at the roamed network 20 performs a calculation using the random number Rn and the temporary authentication key Sa to derive a calculation result (hereinafter referred to as "RES"). Then, RES is fed to the comparing section 26 to be compared with RES contained in the authentication response signal 405 sent from the roaming terminal 10. If RES and RES' coincide with each other, the call control section 24 determines approval of the authentication and instructs the VLR 21 to assign RON to the roaming terminal 10. On the other hand, if RES and RES' do not coincide with each other, the call control section 24 determines disapproval (NG) of the authentication and stops a call connecting process. Upon receipt of RON from the VLR 21, the call control section 24 sends a roaming registration acknowledge signal 406 including RON to the roaming terminal 10 via the radio send/receive section 23a. The call control section 24 further sends an internetwork roaming registration request signal 407 including RON and Sa to the home network 30 via the communication control section 23b.

In response to the roaming registration acknowledge signal 406, the control section at the roaming terminal 10 stores RON and Sa' in the RAM 11b.

In response to the internetwork roaming registration request signal 407, the call control section 34 at the home network 30 stores Sa and RON in association with MSN in the HLR 31a. Then, the call control section 34 sends to the roamed network 20 an internetwork roaming registration acknowledge signal 408 representing an acceptance of the registration. In response to the internetwork roaming registration acknowledge signal 408, the call control section 24 at the roamed network 20 stores RON and Sa in the VLR 21.

In the foregoing manner, the roaming terminal registration procedure is completed. After this, connection processes upon transmission (making a call) from the roaming terminal 10 and upon reception (receiving a call) to the roaming terminal 10 are carried out in the following manner: When performing a transmission from the roaming terminal 10, the roaming terminal 10 sends to the roamed network 20 a transmission request signal including RON.

In response to the transmission request signal received from the roaming terminal 10, the roamed network 20 recognizes from RON contained in the signal that the terminal requesting a transmission (call) is a roaming terminal. Then, the roamed network 20 reads out an authentication key Sa of the roaming terminal corresponding to RON and performs an authentication process using Sa. After the normal completion of the authentication process, the call connecting process is started. On the other hand, when a reception to the roaming terminal 10 occurs, the home network 30 recognizes from RON stored in the HLR 31a that the corresponding terminal is roaming. Then, the home network 30 notifies the roamed network 20 of the reception to the roaming terminal 10 using a notify signal. RON is set in a reception address of the notify signal.

In response to the notify signal from the home network 30, the roamed network 20 reads out from the VLR 21 positional data, an authentication key Sa and the like of the roaming terminal corresponding to RON and carries out the reception connecting process.

As described above, in the foregoing preferred embodiment, since MSN contained in the roaming registration request signal from the roaming terminal is enciphered by the public key of the home network, MSN of the roaming terminal is not known by the third parties including the roamed network. Further, the authentication key used in the authentication process between the roaming terminal and the roamed network is generated at the home network and not peculiar to the roaming terminal. In addition, the authentication key is notified from the roamed network to the roaming terminal in the state enciphered by the public key peculiar to the roaming terminal. Thus, the authentication key is not known by the third parties other than the roamed network.

While the present invention has been described in terms of the preferred embodiment, the invention is not to be limited thereto, but can be embodied in various ways without departing from the principle of the invention as defined in the appended claims.

What is claimed is:

1. A roaming method for allowing a mobile terminal to receive from a roamed network other than a home network of said mobile terminal a mobile communication service among mobile communication services which are offered by a plurality of service providers at different service areas, respectively, said method comprising the steps of:
   providing said mobile terminal with a first cipher key;
   providing said home network with a first decipher key which is for deciphering data enciphered by using said first cipher key;
   notifying identification data from said mobile terminal to said home network via said roamed network;
   enciphering said identification data, as enciphered identification data, using said first cipher key at said mobile terminal; and
   deciphering said enciphered identification data using said first decipher key at said home network.

2. A roaming method as claimed in claim 1, wherein said first cipher key is a public key and said first decipher key is a secret key.

3. A roaming method as claimed in claim 1, further comprising the steps of:
   providing said home network with a second cipher key;
   providing said mobile terminal with a second decipher key;
   sending an authentication key generated at said home network to said roamed network;
   enciphering said authentication key, as an enciphered authentication key, using said second cipher key at said home network and sending said enciphered authentication key to said mobile terminal via said roamed network; and
   deciphering said enciphered authentication key using said second decipher key at said mobile terminal.

4. A roaming method as claim in claim 3, further comprising the steps of:

generating a random number at said roamed network and sending said random number to said mobile terminal along with said enciphered authentication key;
performing a calculation, at said mobile terminal, using said random number and said authentication key deciphered by said second decipher key and sending a result of said calculation to said roamed network; and
performing an authentication process at said roamed network by comparing said calculation result and a result of a calculation using said random number and said authentication key at said roamed network.

5. A roaming method as claimed in claim 3, wherein said second cipher key is a public key and said second decipher key is a secret key peculiar to said mobile terminal.

6. A roaming method as claimed in claim 3, further comprising the step of performing a roaming registration of said mobile terminal at each of said home network and said roamed network using said authentication key and a roaming number assigned to said mobile terminal by said roamed network.

7. A mobile communication system which allows a mobile terminal to receive from a roamed network other than a home network of said mobile terminal a mobile communication service among mobile communication services which are offered by a plurality of service providers at different service areas, respectively, said mobile terminal comprising:
   means for, while roaming, enciphering identification data of said mobile terminal, as enciphered identification data, using a first cipher key and sending said enciphered identification data and a network number of said home network in the form of a roaming registration request signal;
   means for deciphering an authentication key enciphered by a second cipher key and contained in a received authentication request signal; and
   means for storing a roaming number contained in a received roaming acknowledge signal and said authentication key in association with each other,
said roamed network comprising:
   means for, in response to said roaming registration request signal, sending an internetwork roaming request signal including said enciphered identification data to said home network identified by said network number;
   means for storing said authentication key contained in an internetwork roaming response signal received from said home network and said roaming number assigned to said mobile terminal, in association with each other;
   means for sending said authentication key enciphered by said second cipher key and contained in said internetwork roaming response signal to said mobile terminal in the form of said authentication request signal; and
   means for sending said roaming number to said mobile terminal and said home network, and
said home network comprising:
   means for receiving said internetwork roaming request signal and deciphering said enciphered identification data;
   means for generating said authentication key, enciphering said authentication key using said second cipher key corresponding to said identification data and sending said internetwork roaming response signal including said authentication key and said enciphered authentication key; and means for storing said roaming number in association with said identification data.

8. A mobile communication system as claimed in claim 7, wherein said roamed network comprises:
- means for generating a random number to be contained in said authentication request signal;
- calculating means for performing a calculation using said random number and said authentication key;
- comparing means for comparing an output of said calculating means and an authentication response signal from said mobile terminal; and
- means for assigning said roaming number to said mobile terminal when said output and said authentication response signal coincide with each other as a comparison result of said comparing means, and wherein said mobile terminal comprises:
- calculating means for performing a calculation using said random number and said deciphered authentication key; and
- means for sending a calculation result of the calculating means of said mobile terminal to said roamed network in the form of said authentication response signal.

9. A mobile communication system as claimed in claim 7, wherein said first cipher key is a public key peculiar to said home network and said second cipher key is a public key peculiar to said mobile terminal.

* * * * *